United States Patent [19]

Townsley

[11] 3,895,860

[45] July 22, 1975

[54] METHOD FOR COMPARING CORNEAL MEASUREMENTS

[75] Inventor: Malcolm G. Townsley, Park Ridge, Ill.

[73] Assignee: Wesley-Jessen Inc., Chicago, Ill.

[22] Filed: Apr. 8, 1974

[21] Appl. No.: 459,106

[52] U.S. Cl. ................................................ 351/39
[51] Int. Cl. ............................................. A61b 3/00
[58] Field of Search ............................. 351/6, 7, 39

[56] References Cited
OTHER PUBLICATIONS

R. Plummer et al., "Method for Keratographic Recording," British J. of Ophthalm, Vol. 45, No. 4, April 1961, pp. 312–315.
Contacto, "With the Corneopter Corneagraph," Vol. 12, No. 3, Sept. 1968, pp. 17–19.

*Primary Examiner*—Paul A. Sacher
*Attorney, Agent, or Firm*—Pennie & Edmonds

[57] ABSTRACT

A process for comparing sets of corneal measurements is disclosed. On a first occasion a photographic record of the cornea is made with a photoelectronic keratoscope. Using this photographic record, the dimensions of a desired corneal meridian are established. It has been discovered that a single parameter can be calculated from these dimensions which defines a reference curve to which the dimensions can be compared and a record of the comparison produced. The results of this comparison and this parameter are recorded or stored for later retrieval. At a subsequent occasion, a second photographic record of the eye is made. The parameter derived from the earlier reading is then recalled, the reference curve reconstructed, and the dimensions derived from the second record compared to the original reference curve. A comparison of the differences between each set of dimensions and the common reference curve is then available and indicates what changes have taken place in the shape of the cornea.

5 Claims, No Drawings

METHOD FOR COMPARING CORNEAL MEASUREMENTS

BACKGROUND OF THE INVENTION

It is known that changes occur in the corneal shape of the eye due to a variety of different factors. Such factors include pathologic conditions, the influence of medication, the wearing of contact lenses, trauma, surgery, and environmental conditions. In the fitting of contact lenses to the eye, it is desirable for the fitter to have a quantitative indication of these corneal changes before him. This information can help the fitter determine the proper fit for the wearer or even whether or not the wearing of contact lenses is advisable. Corneal changes can be detected by comparing the data derived from successive readings of a photoelectronic keratoscope which have been taken at different times in the patient's history.

When it is desired to fit a person for contact lenses, a pattern of concentric rings is reflected in the cornea of the patient's eye and a photograph of the rings is taken. The photoelectronic keratoscope is used for this operation. The rectangular coordinates of from ten to fifteen points along each of two meridians, at right angles to each other, on the cornea are then derived. Of course, this must be done for each of the patient's two eyes. This discussion will concentrate on the measurement of a single meridian on one of the eyes, with the understanding that the process would be carried out on the horizontal and vertical meridian of each of the patient's two eyes. The coordinate system has its $x$ axis on the visual axis of the cornea, and its origin at the intersection of this axis with the corneal surface. The $y$ axis extends from the intersection of the corneal surface and the $x$ axis. The meridian is defined as the intersection of a plane containing the visual axis with the corneal surface, so that the $x$ coordinate represents the sagittal depth of a point on the meridian from a plane normal to the axis and passing through the point of intersection of the axis and the corneal surface.

The magnitude of the corneal charges between successive photoelectronic keratoscope measurements can be obtained by comparing the earlier and later sets of coordinates derived from a pair of photographs which have been taken before and after the change has occurred.

However, these changes are not readily derived from the two sets of coordinates obtained from the photoelectronic keratoscope. This is due to the fact that the readings from the photoelectronic keratoscope for both the semi-chord or $y$ and sagittal or $x$ dimensions change with changes in the cornea, due to the geometry and optical characteristics of the instrument. Therefore, if one compares the sagittal and semi-chord values for two sets of coordinates as derived from the photoelectronic keratoscope, almost always one will not find a coordinate pair in one of the sets which contains the same sagittal or semi-chord value as a coordinate pair in the other set of coordinates. It becomes necessary to fit a curve to at least one of the sets of coordinates, thus providing a basis for interpolation and comparison of the semi-chord values for any given sagittal coordinate. Having fit this smooth curve to the orginal data, which experience shows can be done so that the maximum departure of the curve to any data point for a normal eye is about 0.001 mm., the second set of data can be compared to the first condition by using the equation for the smooth curve derived from the first set of data, substituting a $y$ or semi-chord value for each point, finding the corresponding $x$ or sagittal value, and comparing the result with the known sagittal value from the second set of data. This is done by subtracting one sagittal value from the other to produce a difference which directly indicates the amount of change.

This prior art technique suffers from a number of severe inadequacies which significantly limit its usefulness. Derivation of a curve which fits the meridian and subsequent interpolation between data points on one curve is a tedious process requiring the services of a highly skilled individual for a considerable period of time. Moreover, even if a computer or some other electrical or mechanical machine is used to reduce the amount of time necessary to perform the operation, the amount of data that must be stored in order to recall earlier corneal dimensions makes the system very cumbersome.

The required storage also results in considerable cost. The procedure requires the storage of six coefficients to an accuracy of at least six significant figures for each meridian which, in a situation where records must be kept for many patients, represents an undesirably cumbersome and expensive bulk of storage. Even if the information is not stored electronically, but is kept on records in the doctor's office, the recordation and entry of a plurality of large numbers is a time consuming task and a likely source of error.

SUMMARY OF THE INVENTION

One of the problems encountered in processes of this type is the cumbersome and expensive nature of the equipment needed to fit the curve, store it for later recall, recall it, compare it to the second reading and produce an output indicative of the change in corneal dimensions. For this reason, it would be desirable to reduce to the minimum possible the volume of information from the first photoelectronic keratoscope reading which must be stored for later recall when a comparison is to be made with a second set of data. If the curve is given in the most general form, the equation has six coefficients which must be stored to at least six significant figures.

In accordance with the method of the present invention, a photoelectronic keratoscope is used to project an image consisting of concentric rings onto the cornea of the patient and photograph the reflected image of these rings. A set of coordinates which define a meridian of the cornea are derived from this photograph. This can be done using a technique described in U.S. Pat. No. 3,781,096. Any standard technique is then used to fit a curve to the thus derived corneal meridian coordinates. This fit must be as close as possible to a perfect fit. In the preferred embodiment, the Gauss-Seidel method of successive approximation is used. The semi-major axis of the ellipse defining the corneal surface is then derived mathematically from the equation obtained using the Gauss-Seidel approximation. A computer may be used to do the Gauss-Seidel approximation and derive the semi-major axis. The semi-major axis is used to generate the central radius of curvature which could have been measured by a keratometer. However, using the computer, it is obtained with greater accuracy than could have been achieved with a keratometer. This parameter is then combined with the mean eccentricity of a large population of corneal meridian to generate an easily storable and recallable reference curve. This reference curve is then compared with the derived coordinates to generate a table of differences which may be displayed in graphic form. The radius of curvature and the table are then stored along with the table of differences. Such storage may be electronic or the information may be stored in conventional files by the doctor.

On a second occasion, the eye is again photographed using the photoelectronic keratoscope and a second set of coordinates defining the same meridian is derived from the resultant photograph. The old semi-major axis is then recalled and used to generate the reference curve. The reference curve is compared with the second set of coordinates defining the corneal meridian and a second table of differences is generated. These two tables of differences may then be visually compared by the doctor fitting the patient to determine the nature and extent of any corneal changes which have occured since the prior fitting. The use of a reference curve has the effect of stripping away the larger, common portions of the first and second set of corneal dimensions. This technique is particularly useful in that the numerical display of differences before the doctor has been made in reference to a normalized equation defining the dimensions of the patient's corneal meridian at the time of the first examination and the quantitative extent of corneal changes is quite easy to ascertain.

DETAILED DESCRIPTION OF THE PREFERRED EMBODIMENT

In accordance with the present invention, when the patient is first examined, a photoelectronic keratoscope, such as that described in U.S. Pat. No. 3,598,478, is used to provide a photographic record of a target image as reflected in the cornea. This photograph is then used to calculate the $x$ and $y$ dimensions, also referred to as the sagittal and semi-chord dimensions respectively, for each point on the corneal meridian.

In many cases, a patient may be undergoing treatment, including the wearing of contact lenses, which makes it desirable to be able to compare a set of corneal meridian coordinates taken at one time with a set taken at another time. This comparison can indicate the nature and the extent of the changes which have taken place. The comparison may be made by comparing two tables of semi-chord and sagittal dimensions calculated from photographs taken on separate occasions. Such a tabular comparison is difficult for two reasons. First, the sagittal dimensions are in the order of 0.5 to 1.5 mm. Differences are significant in the range of 0.002 mm., making the comparison between the last one or two digits of a four digit number. Second, because the semi-chords as well as the sagittal dimensions change, comparisons cannot be made at the same semi-chord.

It has been found that for almost every corneal meridian, it is possible to fit a curve, which is a conic section, to the observed sets of coordinates, with a smoothness such that departure of any single point from the curve is less than 0.0015 mm., over a range of diameters up to 8.5 mm. In normal smooth corneas which have not been subject to pathological or traumatic damage, the smoothness of fit of the curve is within 0.001 mm. This curve can be used to provide a means for interpolation between data points so that the comparison between first and second sets of data can be made by comparing an $x$ coordinate for a $y$ coordinate of a smooth curve derived from a second photograph with the $x$ coordinate for the same $y$ coordinate taken from the smooth curve derived from a first photograph.

Research has shown that a simplified form of the reference curve can be used, which reduces the distance from the curve to the corneal data points to a small value, usually less than 0.030 mm. This curve can be described by the parameters corresponding to semi-major axis and the eccentricity of an ellipse. Furthermore, the above-mentioned research has shown that the normal (mean) value of the eccentricities of the ellipses fitted to each of a large population of eyes can be used as the constant eccentricity of the reference curve without causing the differences to become cumbersome. If the eccentricity is thus standardized at a single value, then the length of the semi-major axis of the ellipse is the only parameter which need be stored for later reconstruction of the reference curve. It is convenient, for other reasons, to store the vertex power, but this bears a constant numerical relation to the semi-major axis.

The general form of the second degree equation which provides a nearly exact fit for a corneal meridian is:

$$ax^2 + bxy + cy^2 + dx + ey + g = 0 \qquad (1)$$

and this equation can be fitted to the data points by substituting pairs of $x$ and $y$ values and solving the resulting set of simultaneous equations for the coefficients $a$, $b$, $c$, $d$, $e$, and $g$, by methods which are well known in the science of mathematics. Specifically, the Gauss-Seidel method of successive approximations is quite successful and efficient.

This equation will give us a mathematical representation of a corneal meridian that is, for most intents and purposes exact.

If we provide a reference curve of known equation which will pass close to the first set of standardized coordinates, we can represent the data points in terms of their departure from this reference curve, and the departures will be smaller than the departures from the straight line axis from which the coordinates are measured.

As noted above, any corneal meridian can be represented by a curve whose equation is that of a conic section, which may be written:

$$ax^2 + bxy + cy^2 + dx + ey + g = 0 \qquad (1)$$

It is now desired to compute a single coefficient which will define the reference curve against which the actual measured points on the cornea may be compared. It is the practice of the optometrist to measure the central curvature of the cornea by means of an instrument called a keratometer or ophalomometer. This instrument presents a pair of illuminated markings at a known separation from each other, and at a known distance from the cornea. A virtual image is formed by reflection of these markings from the cornea. The geometry of the keratometer is such that the separation of the two images gives the separation of two points of known equal and opposite slope on the cornea. The radius of curvature of a sphere tangent to the corneal meridian at the two points measured with this instrument is equal to a constant $k$ multiplied by the length of the chord separating the two points of reflection. Therefore, to measure the cornea, the reading of the instrument is simply multiplied by the constant $k$ to obtain the radius of a sphere tangent to the actual cornea at the two reflection points. The radius of this tangent sphere is useful in the optical calculations which are used in the design of a contact lens, and should be available as a part of the corneal analysis.

The radius of the tangent sphere is derived from the data calculated by the Gauss-Seidel as follows. The chord length between reflections points in a keratometer is approximately 3 mm. A representative cornea shows a "keratometer curvature" of 7.8 mm. plus or minus about 1 mm. We would therefore like to calculate the slope of the sphere of 7.8 mm. radius at a chord of 3 mm. insofar as this information will help us determine the proper point using equation (1). The equation of a circle is:

$$x^2 - 2Rx + y^2 = 0 \quad (2)$$

where $R$ is the radius. The slope for any $y$ is:

$$S = (R - x)/y \quad (3)$$

but $$(R - x) = \sqrt{R^2 - y^2} \quad (4)$$

and substituting $$S = \sqrt{R^2 - y^2}/y \quad (5)$$

It is noted that the value of $y$ at this point is half the chord length of 3 mm. or 1.5 mm. Substituting 7.8 for $R$ and 1.5 for $y$, $$S = \sqrt{26.04} = 5.103 \quad (6)$$

If we find the chord separating points on the corneal curve having slopes of $+5.103$ and $-5.103$, we can multiply its length by $k = 7.8/3.0$ to get the keratometer curvature or central radius of curvature. We have the coefficients for the corneal curve:

$$ax^2 + bxy + cy^2 + dx + ey + g = 0 \quad (1)$$

The $y$ coordinate $Y_s$ for any slope is found by differentiating and rearranging terms.

$$Y_s = \frac{-(2ax + bxs + es + d)}{b + 2cs} \quad (7)$$

But this equation contains $x$. It is possible to solve equation (1) for $x$ and substitute into equation (7) but the algebra is cumbersome and it turns out to be more convenient to use an iterative solution in a digital computer. An approximate value (e.g. 1.5) is chosen for $Y_s$. The value of the $x$ coordinates $X_s$ is found from the solution of equation (1) for $x$.

$$X_s = [(-by - d) \pm \sqrt{(by + d)^2 - a(cy^2 + ey + g)}]/a \quad (8)$$

This is substituted in equation (7) to find a new value for $Y_s$. If this new value differs from the initial value of $Y_s$, the new value of $Y_s$ is used in equation (8) to find a closer approximation for $X_s$ and the iteration repeated until the change in $Y_s$ between successive iterations is acceptably small, usually less than 0.0005 mm. This procedure is used to find $Y_s$ for a slope of $+5.103$ and $Y_s'$ for a slope of $-5.103$. Then the length of the chord $L_c$ is defined by the equation:

$$L_c = Y_s - Y_s' \quad (9)$$

and the radius of curvature $R_c$ is defined by the equation:

$$R_c = L_c k = L_c(7.8/3.0) \quad (10)$$

the radius of curvature may be expressed either in millimeters of radius, $R_c$, as given by equation (10) or in terms of the vertex power, $V_c$, which is in units of diopters where:

$$V_c = 337.5/R_c \quad (11)$$

We now have a vertex power, $V_c$, which is characteristic of this corneal meridan. We choose to use as a reference curve the ellipse having the same central curvature as the actual cornea. We also choose an eccentricity, $e$, of 0.5 which is the mean value for a large population. The problem now is to find the constants for an ellipse of 0.5 eccentricity and a slope of 26.04 at the chord height found for the corneal meridian. The equation for the orthogonal ellipse is:

$$x^2 - 2px + y^2/Q = 0 \quad (12)$$

where $p$ is the semi-major axis and $$Q = 1 - e^2 \quad (13)$$

Following the same logic as for the circle, $$p = (y/Q) \sqrt{s^2 + Q} \quad (14)$$

Rearranging equation (11), we have:

$$R_c = 337.5/V_c \quad (15)$$

Rearranging equation (10), we have:

$$L_c = R_c(3.0/7.8) \quad (16)$$

We know:

$$Y_s = L_c/2 \quad (17)$$

Substituting and simplifying, we obtain:

$$Y_s = 64.9038/V_c \quad (18)$$

Substituting this value of $Y_s$ for $y$ in equation (14) and substituting the slope at $Y_s$, we obtain:

$$p = [(64.9038/V_c Q)] \sqrt{26.04^2 + Q} \quad (19)$$

and for $Q = 0.75$ $$p = (86.5384/V_c)(\sqrt{26.79}) = 441.605/V_c$$

(20)

We now find the value of $p$ for the value of $V_c$, previously calculated using equation (11), for the specific meridian and substitute into equation (12) to obtain the reference curve.

Thus, with the value of $Q$ standardized at 0.75, a knowledge of the vertex power is sufficient to reproduce the equation of the original reference curve. The equation would thus take the form:

$$x^2 - (883.211/V_c)x + y^2/0.75 = 0$$

(21)

where $x$ is the sagittal coordinate in millimeters, $y$ is the semi-chord coordinate in millimeters, and $V_c$ is the vertex power is diopters.

The reference curve defined by equation (21) is a stylized standard curve which is a very close representation of the actual corneal meridian. This stylized standard reference curve is used as a reference from which to measure the actual shape of the corneal meridian which is defined by the equation derived by the Gauss-Seidel method. The differences between this reference curve and the actual data points are tabulated. These turn out to be very small and therefore easy to store. This first table of differences together with the vertex power defines the actual shape of the corneal meridian.

Such a table of differences can give an indication of the relation of the patient's cornea to the mean of the population. The reference curve is orthogonal to the visual axis, so that the table of differences also shows any asymmetry which may quite commonly exist. While it is interesting and useful to compare the corneal curve at any given time with the corneal shape corresponding to the mean of the population, it is much more useful to be able to follow changes in the cornea over a period of time or a course of treatment. To make this comparison of the corneal curves at two different times, it is necessary to produce a second table of differences which can be compared to detect changes which have taken place. The shape of the corneal meridian in the form of the vertex power of the cornea and the table of differences is therefore stored for later recall. In accordance with the present invention, such storage may be done using conventional files or electronic data processing equipment. Due to the manageable form in which the data exists, it can be most easily stored and retrieved using either of these methods.

At a subsequent occasion when the patient returns for a second fitting, the photoelectronic keratoscope is again used to obtain a set of corneal coordinates. The original reference curve is then recalled. The differences between the data derived from the second fitting and the reference curve is tabulated into a second table of differences. The first set of tabular data is then recalled. The comparison between the first set of tabular data and the second set of tabular data gives a very convenient and easy to evaluate display of the changes which have occurred in the cornea since the prior examination.

I claim:

1. A method for ascertaining changes in corneal dimensions, comprising the steps of:
   a. measuring a corneal meridian at a first point in time to obtain a first set of data defining said corneal meridian;
   b. generating a reference curve from said first set of data;
   c. tabulating the differences between said first set of data and said reference curve;
   d. storing said tabulated differences and said reference curve;
   e. measuring the corneal meridian at a subsequent point in time to obtain a second set of data;
   f. regenerating said reference curve; and
   g. tabulating the differences between said reference curve and said second set of data.

2. A method as in claim 1, wherein said reference curve is generated by deriving the vertex power of said corneal meridian or a parameter related to said vertex power from said first set of data and using said vertex power to derive said reference curve.

3. A method as in claim 2, wherein said reference curve is determined by said parameter and the mean eccentricity of a large population of corneal meridians.

4. A process as in claim 3, wherein said reference curve is stored by storing said vertex power.

5. A method for ascertaining changes in corneal dimensions as in claim 4, wherein said reference curve is defined by the equation:

$$x^2 - 2px + y^2/Q = 0$$

where $x$ is the sagittal coordinate in millimeters, $y$ is the semi-chord coordinate in millimeters, $Q$ is greater than 0.50 and less than 1, and $p$ is calculated from the equation:

$$p = [(64.9038/V_cQ)]\sqrt{26.04^2 + Q}$$

where $V_c$ is the vertex power in diopters.

* * * * *